United States Patent
Ye et al.

(10) Patent No.: US 12,058,741 B2
(45) Date of Patent: Aug. 6, 2024

(54) COVERAGE ENHANCEMENTS IN NTN

(71) Applicant: APPLE INC., Cupertino, CA (US)

(72) Inventors: Chunxuan Ye, San Diego, CA (US); Chunhai Yao, Beijing (CN); Dan Zhang, San Diego, CA (US); Dawei Zhang, Cupertino, CA (US); Haitong Sun, Cupertino, CA (US); Hong He, Cupertino, CA (US); Idan Bar-Sade, Cupertino, CA (US); Ruoheng Liu, San Diego, CA (US); Wei Zeng, Cupertino, CA (US); Weidong Yang, San Diego, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/593,357

(22) PCT Filed: Sep. 2, 2021

(86) PCT No.: PCT/CN2021/116203
§ 371 (c)(1),
(2) Date: Sep. 16, 2021

(87) PCT Pub. No.: WO2023/028941
PCT Pub. Date: Mar. 9, 2023

(65) Prior Publication Data
US 2024/0015794 A1 Jan. 11, 2024

(51) Int. Cl.
*H04L 1/00* (2006.01)
*H04W 72/11* (2023.01)
*H04W 72/1268* (2023.01)
*H04W 74/00* (2009.01)
(Continued)

(52) U.S. Cl.
CPC ........ *H04W 74/0833* (2013.01); *H04W 72/11* (2023.01); *H04W 72/1268* (2013.01); *H04W 84/06* (2013.01)

(58) Field of Classification Search
None
See application file for complete search history.

(56) References Cited

U.S. PATENT DOCUMENTS

| 2021/0105126 | A1 | 4/2021 | Yi et al. |
| 2021/0321465 | A1* | 10/2021 | Zhang ............... H04W 74/0833 |

(Continued)

FOREIGN PATENT DOCUMENTS

CN 111201747 A 5/2020

OTHER PUBLICATIONS

Apple, "On Timing Relationship Enhancements in IoT NTN", R1-2107773, 3GPP TSG RAN WG1 #106-e, e-Meeting, Agenda Item 8.15.2, Aug. 16-27, 2021, 4 pages.

(Continued)

*Primary Examiner* — Ajit Patel
(74) *Attorney, Agent, or Firm* — Dorsey & Whitney LLP

(57) ABSTRACT

Indicating repetitions at a UE in an NTN includes decoding a communication indicating a timing relationship value associated with a distance between a serving satellite and a farthest UE in the NTN. A PRACH communication is encoded for transmission. The PRACH communication includes an indication of a number of PRACH repetitions determined based on the timing relationship value. A RAR including an uplink (UL) grant corresponding to the UE and an indication of a number of RAR repetitions is decoded. The number of RAR repetitions is determined based on the timing relationship value. A PUSCH communication including an indication of a number of PUSCH repetitions is encoded. The number of PUSCH repetitions is determined based on the timing relationship value. A content resolution communication including an indication of a number of (Continued)

content resolution repetitions is decoded. The number of content resolution repetitions is determined based on the timing relationship value.

20 Claims, 10 Drawing Sheets

(51) Int. Cl.
*H04W 74/0833* (2024.01)
*H04W 84/06* (2009.01)

(56) References Cited

U.S. PATENT DOCUMENTS

| | | | |
|---|---|---|---|
| 2022/0015148 A1* | 1/2022 | Sengupta | H04W 74/006 |
| 2022/0286235 A1* | 9/2022 | Ranta-Aho | H04L 1/1822 |
| 2023/0042922 A1* | 2/2023 | Taherzadeh Boroujeni | H04W 72/23 |
| 2023/0254900 A1* | 8/2023 | Khan | H04W 74/0866 370/329 |
| 2023/0291504 A1* | 9/2023 | Cheng | H04W 74/0841 |
| 2024/0121830 A1* | 4/2024 | Ma | H04W 74/0866 |

OTHER PUBLICATIONS

Panasonic, "Timing relationship enhancement for NTN", R1-2009049, 3GPP TSG RAN WG1 #103e, E-meeting, Agenda Item 8.4.1, Oct. 26-Nov. 13, 2020, 5 pages.
PCT/CN2021/116203, International Search Report and Written Opinion, Mar. 28, 2022, 9 pages.

* cited by examiner

COVERAGE ENHANCEMENTS IN NTN

TECHNICAL FIELD

This application relates generally to wireless communication systems, including indicating repetitions in a non-terrestrial network (NTN).

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a or g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
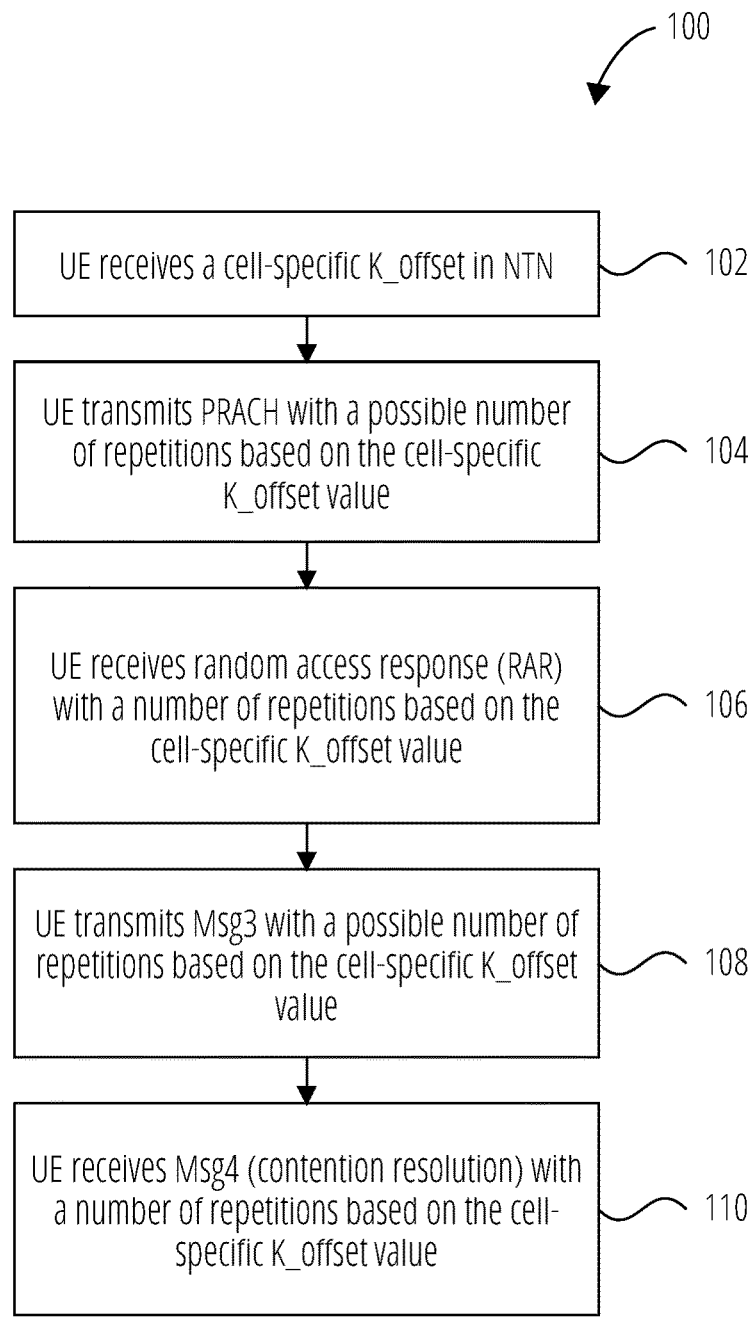
FIG. 1 illustrates an example flowchart of a method associated with a 4-step RACH procedure using a K_offset value in accordance with one embodiment.

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

By way of background, current 3GPP RAN1 agreements on non-terrestrial network (NTN) include: 1. Regarding K_offset used in initial access, the information of K_offset being carried within system information (SI); 2. The K_offset value signaled in system information being used for all timing relationships that require a K_offset enhancement when a UE is not provided with another K_offset value (i.e., other than the K_offset value signaled within the system information); 3. In some embodiments, the K_offset value signaled in system information always being used for: a. A transmission timing of a random access response (RAR)/fallbackRAR grant scheduled physical uplink shared channel (PUSCH); b. A transmission timing of a Message 3 (Msg3) retransmission scheduled by downlink control information (DCI) format 0_0 with a cyclic redundancy check (CRC) scrambled by temporary cell-radio network temporary identifier (TC-RNTI); c. A transmission timing of a hybrid automatic repeat request-acknowledgment (HARQ-ACK) on a physical uplink control channel (PUCCH) to contention resolution physical downlink shared channel (PDSCH) scheduled by DCI format 1_0 with CRC scrambled by TC-RNTI; and d. A transmission timing of HARQ-ACK on a PUCCH to Message B (MsgB) scheduled by DCI format 1_0 with CRC scrambled by MsgB-RNTI; and 4. Enhancement(s) on an aggregated transmission (including repetition) being prioritized to improve performance in an NTN.

In addition, RAN4 may consider pairing the 1610-1618.725 megahertz (MHz) uplink (UL) (L-band) and the 2483.5-2500 MHz downlink (DL) (S-band) in a separate dedicated work item (WI), as is common practice for any terrestrial network (TN) band in RAN4. The core functionality of which may be forward compatible with mixed pairing.

A Power Flux Density (PFD) limitation on the S-band described above may include: 1. Radio Regulations (Appendices), which may further include: a. For the S-band in relation to mobile-satellite service: i. Geostationary (GSO) space stations may have a PFD: $P=-146$ dB $(W/m^2)$ in 4 kHz and $-728$ dB $(W/m^2)$ in 1 MHz, with $r=0.5$; ii. Non-GSO space stations may have a PFD: $P=-144$ dB $(W/m^2)$ in 4 kHz and $-726$ dB $(W/m^2)$ in 1 MHz, with $r=0.65$. With respect to non-GSO, depending on regions, the following may apply: $P=-142.5$ dB $(W/m^2)$ in 4 kHz and $-724.5$ dB $(W/m^2)$ in 1 MHz; and iii. $PFD=P$, for $0°\leq\delta\leq5°$; $PFD=P+r$ $(\delta-5)$, for $5°\leq\delta\leq25°$; and $PFD=P+20r$, for $25°\leq\delta\leq90°$; and 2. Downlink transmission power (or EIRP) in the S-band may not be large enough to cover a whole cell of a satellite (i.e., the downlink channel may have to include a coverage enhancement).

Notably, the general 4-Step random access channel (RACH) procedure (i.e., with respect to a TN) may include: 1. A UE transmitting a RACH preamble on a Physical RACH (PRACH). The PRACH resource may be associated with a DL Synchronization Signal Block (SSB) index. As such, the base station (e.g., gNB) may know best UE's SSB; 2. The base station (e.g., gNB) responding to the UE by transmitting Message 2 (Msg2), which may be scheduled by a PDCCH format 1_0 with CRC scrambled by random access-RNTI (RA-RNTI) and sent over PDSCH. In addition, Msg2 may include TC-RNTI, a timing advance, and a UL grant for the UE's future Message 3 (Msg3) transmission; 3. The UE transmitting Msg3, including uplink scheduling information, on the PUSCH grant indicated by the base station via Msg2. If the base station fails to decode Msg3, the base station may send a PDCCH 0_0 with CRC scrambled by TC-RNTI to reschedule Msg3. Furthermore, Msg3's waveform (Direct Fourier Transform-spread-Orthogonal Frequency-Division Multiplexing (DFT-s-OFDM) or OFDM) may be broadcast in SI (e.g., Remaining Minimum SI (RMSI)); and 4. The base station acknowledging reception of the UE's Msg3 by scheduling a PDSCH grant (i.e., Message 4 (Msg4)), including contention resolution. The UE may monitor fall-back DCIs 0_0 and 1_0 with CRC scrambled by TC-RNT (0_0 would reschedule Msg3, while 1_0 would schedule a PDSCH).

Similarly, the general 2-step RACH procedure may include: 1. A Message A (MsgA) that is related to Msg1 (i.e., PRACH) and Msg3 (i.e., PUSCH) described above with respect to the 4-step RACH procedure; and 2. A Message B (MsgB) that is related to Msg2 (i.e., RAR) and Msg4 (i.e., contention resolution) described above with respect to the 4-step RACH procedure.

While the above procedures work well for TN scenarios, coverage may have to be enhanced for NTN scenarios. With respect to such initial access procedures in an NTN scenario, the following issues may be particularly relevant: 1. A number of repetitions, inter-slot frequency hopping, and MCS tables, which may each depend on the pathloss of a service link; 2. How to make use of cell specific K_offset information to enhance the coverage in an initial access procedure; and 3. How to make use of UE-specific K_offset information to enhance coverage in RRC connected mode.

Initially, a number of solutions related to implicit indication of a number of repetitions with respect to initial access within an NTN scenario are discussed, followed by solutions related to an enhanced aggregated transmission (i.e., after connection via initial access has occurred). For instance, in a first solution, a number of repetitions may depend on a cell-specific K_offset. Notably, the pathloss depends on the distance between a UE and a serving satellite. In addition, a cell-specific K_offset (i.e., instead of a UE-specific K_offset, as further described below) may comprise a timing relationship enhancement associated with (i.e., to cover) a UE that is farthest way in the applicable cell coverage. Accordingly, the larger a cell-specific K_offset value, the larger a distance between the farthest UE and the corresponding satellite. Similarly, in general, the larger a cell-specific K_offset value, the more a coverage enhancement has to be used.

FIG. 1 illustrates an example flowchart of a method 100 associated with a 4-step RACH procedure using a K_offset value, as further described herein. Initially, in block 102, the method 100 includes a UE receiving a cell-specific K_offset value in an NTN scenario. Notably, such K_offset value may comprise a cell-specific K_offset value, which may be broadcast via a system information block (SIB). This step has to occur first as the UE has to know the cell specific K_offset value before the initial access procedure can be performed.

In block 104, the method 100 includes the UE transmitting a PRACH with a possible number of repetitions based on the received cell-specific K_offset value.

Accordingly, the UE may enhance PRACH transmissions by a number of repetitions based on the cell-specific K_offset value. For example, a cell-specific K_offset threshold may be pre-defined or may be configured (e.g., broadcast over SIB). Multiple dedicated ROs may be configured for NTN PRACH repetition. In addition, any applicable type of threshold may be used. For instance, a threshold may comprise a given number of slots (e.g., 2 slots, 4 slots, 5 slots, and so forth).

If the cell-specific K_offset is larger than a given K_offset threshold (as further described herein), the PRACH transmission repetitions (i.e., determined based on the cell-specific K_offset) may be performed. In contrast, if the cell-specific K_offset is smaller than the K_offset threshold, the PRACH transmission repetitions may not be performed. In some embodiments, multiple cell-specific K_offset thresholds may be utilized. In such embodiments, different repetition numbers may each correspond to a different K_offset threshold. For instance, if the cell-specific K_offset is greater than a first threshold, the number of repetitions may comprise a positive integer X; if the cell-specific K_offset is greater than a second threshold, the number of repetitions may comprise a positive integer Y; and if the cell-specific K_offset is greater than a third threshold, the number of repetitions may comprise a positive integer Z (where $Z>Y>X$). While the example above includes three thresholds, any number of thresholds may be used when practicing the principles described herein.

In block 106, the method 100 includes the UE receiving a random access response (RAR) with a number of repetitions/transmissions based on the cell-specific K_offset value. In some embodiments, the repetition of PDSCH with RAR can be indicated by a Time Domain Resource Allocation (TDRA). In such embodiments, new entries may be introduced in a TDRA table. If the broadcasted cell-specific K_offset value is larger than a K_offset threshold, the RAR transmission repetitions may be performed. In contrast, if the cell-specific K_offset value is smaller than the K_offset threshold, the RAR transmission repetitions may not be performed.

Different K_offset thresholds may be used for RAR repetitions and PRACH repetitions. For instance, Koffset_thre1 (i.e., a first threshold) may be used for PRACH repetition and Koffset_thre2 (i.e., a second threshold) may be used for RAR repetitions. In contrast, a same K_offset threshold may be used for both RAR repetitions and PRACH repetitions, in some embodiments. In an example, such thresholds may comprise a number of slots (e.g., 2 slots, 5 slots, 10 slots, and so forth).

Furthermore, different numbers of repetitions may be used for each of RAR and PRACH. For example, if the cell-specific K_offset is larger than a threshold, the PRACH repetition number may be a number X and the RAR repetition number may be a number Y (X may or may not be equal to Y).

In block 108, the method 100 includes the UE transmitting Msg3 with a possible number of repetitions based on the cell-specific K_offset value. Despite the RAR grant possibly scheduling a single transmission of Msg3, the number of Msg 3 repetitions may be implicitly indicated by the cell-specific K_offset value. In other embodiments, a new field in RAR may be introduced that indicates a Msg3 repetition number.

In block 110, the method 100 includes the UE receiving Msg4 (contention resolution) with a number of repetitions based on the cell-specific K_offset value.

Figure 2:
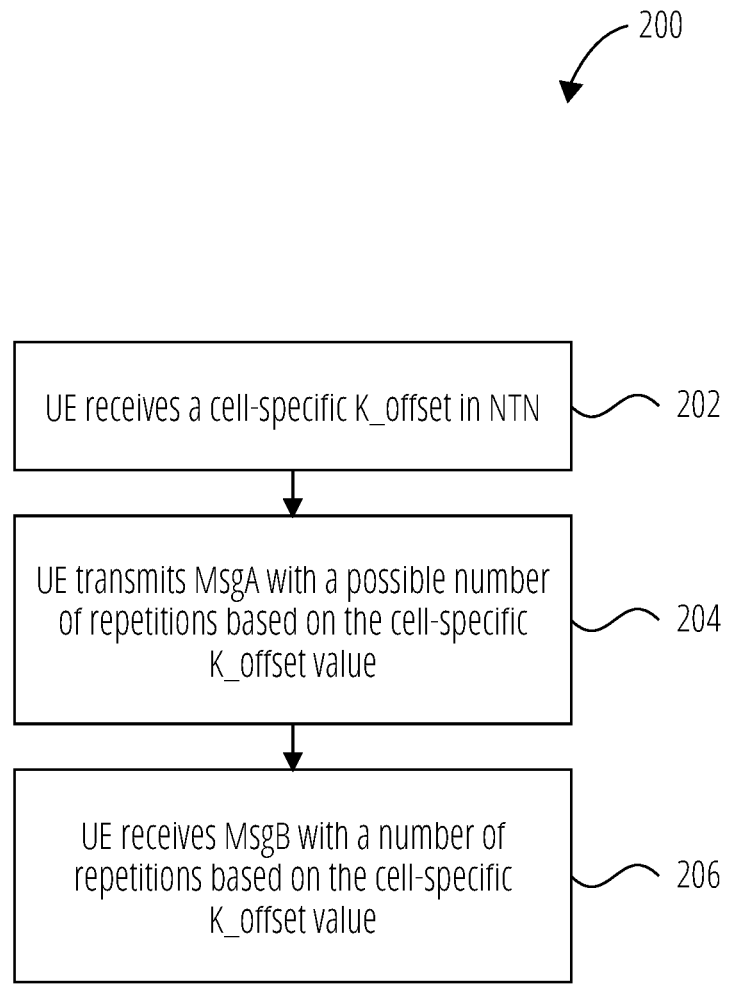
FIG. 2 illustrates example flowchart of a method associated with a 2-step RACH procedure using a K_offset value in accordance with one embodiment.

FIG. 2 illustrates an example flowchart of a method 200 associated with a 2-step RACH procedure using a K_offset value, as further described herein. In block 202, the method 200 includes the UE receiving a cell-specific K_offset in NTN. The UE may use the cell-specific K_offset value to enhance PRACH and Msg A PUSCH transmissions through repetitions. As such, in block 204, the method 200 includes the UE transmitting MsgA with a possible number of repetitions based on the cell-specific K_offset value.

Notably, different numbers of repetitions of PRACH transmissions and MsgA PUSCH transmissions may be used. For example, if the cell-specific K_offset is larger than a K_offset threshold, the number of PRACH transmission repetitions may be a positive integer X and the number of MsgA PUSCH transmission repetitions may be a positive integer Y (i.e., where the integer X may be different from the integer Y). In such embodiments, PRACH transmission repetitions and PUSCH transmission repetitions may be based on a single threshold or multiple thresholds (e.g., a first threshold corresponding to the PRACH repetitions and a second threshold corresponding to the PUSCH repetitions, multiple thresholds corresponding to each of the PUSCH repetitions and the PRACH repetitions, and so forth). In addition, dedicated ROs and PUSCH Occasions (POs) may be assigned for NTN repetition. Furthermore, the number of repetitions of fallback RAR or fallback RAR-scheduled PUSCH may also depend on the cell-specific K_offset value. Finally, in block 206, the method includes the UE receiving MsgB with a number of repetitions based on the cell-specific K_offset value.

In a second solution related to implicit indication of a number of repetitions with respect to initial access within an NTN scenario, frequency hopping may depend on a cell-specific K_offset. In addition to the repetition number, inter-slot frequency hopping may also be triggered by a cell-specific K_offset. In particular, if the cell-specific K_offset is larger than a K_offset threshold, the frequency hopping may be applied. In contrast, if the cell-specific K_offset is smaller than the K_offset threshold, the frequency hopping may not be applied.

Such frequency hopping may be applied to any of the initial access messages (e.g., Msg1, Msg2, MsgA, and so forth). In addition, frequency hopping may be defined. For instance, frequency hopping may be defined as per slot frequency hopping, as per bundling window (i.e., a particular number of slots) frequency hopping, and so forth. Furthermore, the frequency hopping can be applied to both UL and DL transmissions.

In a third solution related to implicit indication of a number of repetitions with respect to initial access within an NTN scenario, frequency hopping may again depend on a cell-specific K_offset. In particular, in addition to the repetition number, a modulation and coding scheme (MCS) table used in Msg3 may depend on a cell-specific K_offset. For instance, if the cell-specific K_offset is larger than a K_offset threshold, the MCS table 3 may be applied for low-spectrum efficiency case. In contrast, if the cell-specific K_offset is smaller than the K_offset threshold, the MCS table 1 may be applied.

In a fourth solution related to implicit indication of a number of repetitions with respect to initial access within an NTN scenario, different K_offset thresholds may be used for different satellite scenarios. In particular, a K_offset threshold may be based on a satellite scenario (e.g., a geosynchronous equatorial orbit (GEO), low Earth orbit (LEO), and so forth). Notably, a GEO satellite may have larger gain-to-noise-temperature (G/T) values or a larger effective isotropically radiated power (EIRP) density than an LEO satellite. The link budget for a GEO scenario may also generally be more relaxed than in an LEO scenario. In addition, for GEO satellite scenarios, a K_offset threshold (i.e., for triggering repetitions during the initial access procedure) may be larger than a K_offset threshold for LEO satellite scenarios.

As briefly described above, solutions related to enhanced aggregated transmissions (i.e., after connection via initial access has occurred) are now discussed. In particular, an aggregation factor may be utilized that is based on a distance between the UE and the serving satellite. As briefly discussed above, the distance between a particular UE and its corresponding serving satellite may be associated with a UE-specific K_offset value. For instance, if a UE-specific K_offset value is larger than a threshold, the UE may be considered to be far from the serving satellite. In contrast, if the UE-specific K_offset value is smaller than a threshold, the UE may be considered to be near the serving satellite. In addition, multiple of such thresholds may be configured in a given scenario. While UE-specific K_offset values are discussed with respect to these solutions, cell-specific K_offset may also be used in some scenarios (e.g., when a UE-specific K_offset is not signaled/provided). Besides cell-specific K_offset and UE-specific K_offset, the TA (either UE specific TA or full TA) reported from UE to network may also be used to determine the distance between a particular UE and its corresponding serving satellite and hence, could be used.

Notably, a pathloss may be larger (and the number of repetitions may be larger) for UEs that are farther away from a serving satellite. For instance, in a first scenario associated with a semi-persistent scheduling (SPS) configuration, more than one PDSCH aggregation factor value may be configured (e.g., one repetition versus four repetitions). In particular, SPS configurations include an entry referred to as "pdsch-AggregationFactor." Currently, only a single value (from a value set {1, 2, 4, 8}) is configured in an SPS configuration. In an example, the foregoing implies that PDSCH may always be transmitted twice within a given period when the configured value is 2.

Accordingly, in this first scenario, multiple values may now be configured for the "pdsch-AggregationFactor" entry/variable in an SPS configuration. In an example, "pdsch-AggregationFactor" may be configured with the values 2 and 4 in an SPS configuration. In such a scenario, the number of PDSCH repetitions in a given period may then be either 2 or 4, depending on the UE-specific K_offset value. As such, if the distance between a UE and a serving satellite is large (i.e., as indicated by the UE-specific K_offset), a large PDSCH aggregation factor may be applied (e.g., the value of 4 in the previous example). In contrast, if the distance between the UE and the serving satellite is small, a small PDSCH aggregation factor may be applied (e.g., the value of 2 used in the previous example. In this way, an SPS configuration may be flexible based on a distance between the UE and the serving satellite. In addition, the foregoing may allow for avoiding frequent SPS configuration updates when a distance between the UE and the serving satellite changes.

In a second scenario associated with a configured grant configuration (type 1 or type 2), more than 1 "repK" value may be configured. In particular, configured grant configurations include an entry referred to as "repK". Currently, only a single value (from value set {1,2,4,8}) is selected in the configured grant configuration, which may indicate a number of repetitions of PUSCH within a given period. Accordingly, "repK" is similar to "pdsch-AggregationFactor" of an SPS configuration, but for uplink transmissions.

Additionally, similar to the SPS configuration solution above, multiple values from the value set {1,2,4,8} may now be configured in a configured grant configuration. The number of PUSCH repetitions may then be selected from the multiple configured values depending on a UE-specific K_offset value. As such, if the distance between a UE and a serving satellite is large, a large value (of multiple values) selected for "repk" and thus, a large number of repetitions, may be used. In contrast, if the distance between the UE and the serving satellite is small, a small value (of multiple values) selected for "repk" and thus, a small number of repetitions, may be used. In this way, configured grant configurations may be flexible based on a distance between a UE and a serving satellite in an NTN. The foregoing may allow for avoiding frequent configured grant configuration updates when a distance between a UE and a serving satellite changes.

In some embodiments, the distance between the UE and the serving satellite may be based on the actual measured distance rather than a UE-specific K_offset. In such embodiments, a configuration of hysteresis of the threshold may be used (e.g., distance>threshold+hysteresis, which implies increased repetitions or distance<threshold−hysteresis, which implies decreased repetitions).

In a third scenario associated with a dynamic grant, a "NumberOfRepetitions-r16" field in "PUSCH-TimeDomainResourceAllocation-r16" or a "PDSCH-TimeDomain-ResourceAllocation-r16" information element (IE) may include more than one value. In an example, if the distance between a UE and a serving satellite is large, a large number of repetitions may be used. In contrast, if the distance between the UE and the serving satellite is small, a small number of repetitions may be used. In some embodiments larger repetition numbers may also be introduced (e.g., 32 repetitions, 64 repetitions, and so forth).

The association described above between an aggregation factor and a UE-satellite distance may also be extended to other link adaptation factors (e.g., MCS table selection, MCS values, SPS configuration, configured grant configuration, and so forth). For instance, SPS configurations include an MCS table entry. While legacy procedures may allow for only a single MCS table to be configured with respect to SPS configurations, the principles described herein may allow for configuring more than one MCS table in an SPS configuration (i.e., similar to the "pdsch-AggregationFactor entry further discussed above). In this way, multiple MCS tables being simultaneously configured may allow for flexibility depending on UE-specific Koffset value rather than continuous configuration updates based on changes in distances between a UE and a serving satellite.

Similar procedures may also be applied to configured grant configurations for uplink transmissions. Furthermore, in type 1 configured grant configurations, multiple MCS values may now be configured in an MCS table (while legacy procedures allow only a single MCS value to be configured). Again, using multiple MCS values in this way, allows for flexible usage of MCS values depending on UE-specific Koffset value rather than continuous updates to configurations.

Figure 3:
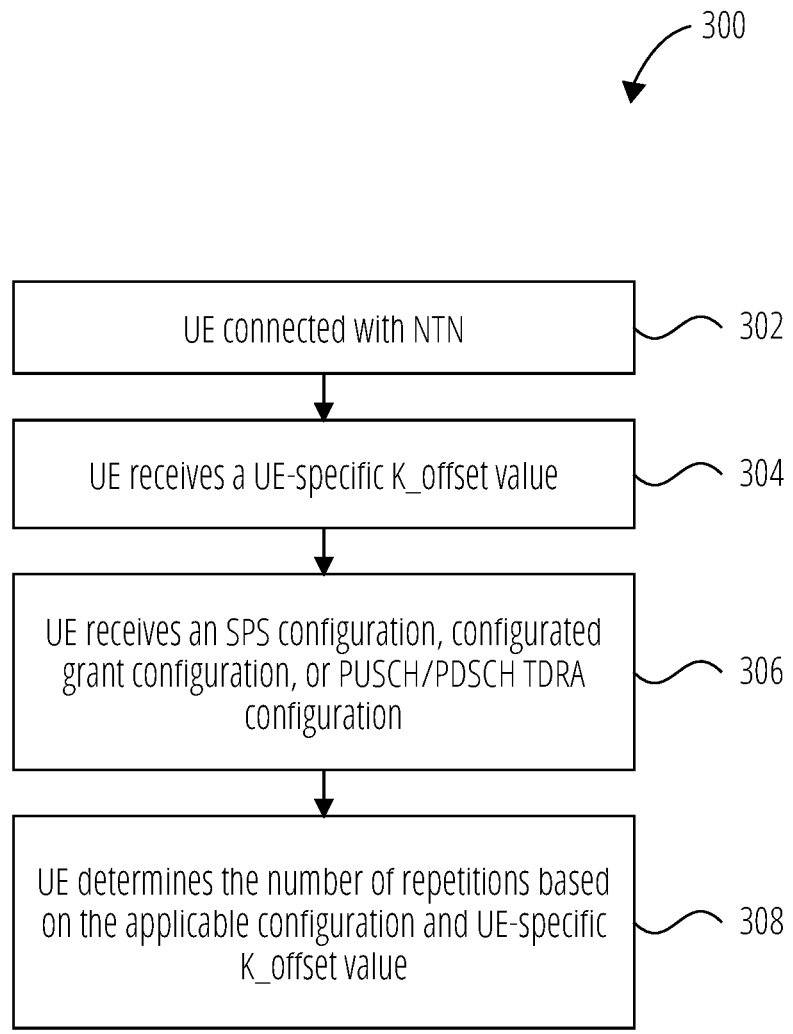
FIG. 3 illustrates a flowchart of a method for determining a number of repetitions in a configured grant scenario, an SPS grant scenario, or a dynamic grant scenario in accordance with one embodiment.

FIG. 3 illustrates a flowchart of a method 300 for determining, at a UE, a number of repetitions in a configured grant scenario, an SPS grant scenario, or a dynamic grant scenario. As illustrated, in block 302, the method 300 includes the UE being connected in an NTN scenario. In block 304, the method 300 includes the UE receiving a UE-specific K_offset value. In block 306, the method 300 includes the UE receiving an SPS configuration, configured grant configuration, or PUSCH/PDSCH TDRA configuration. In block 308, the method 300 includes the UE determining the number of repetitions based on the applicable configuration and the UE-specific K_offset value.

Figure 4:
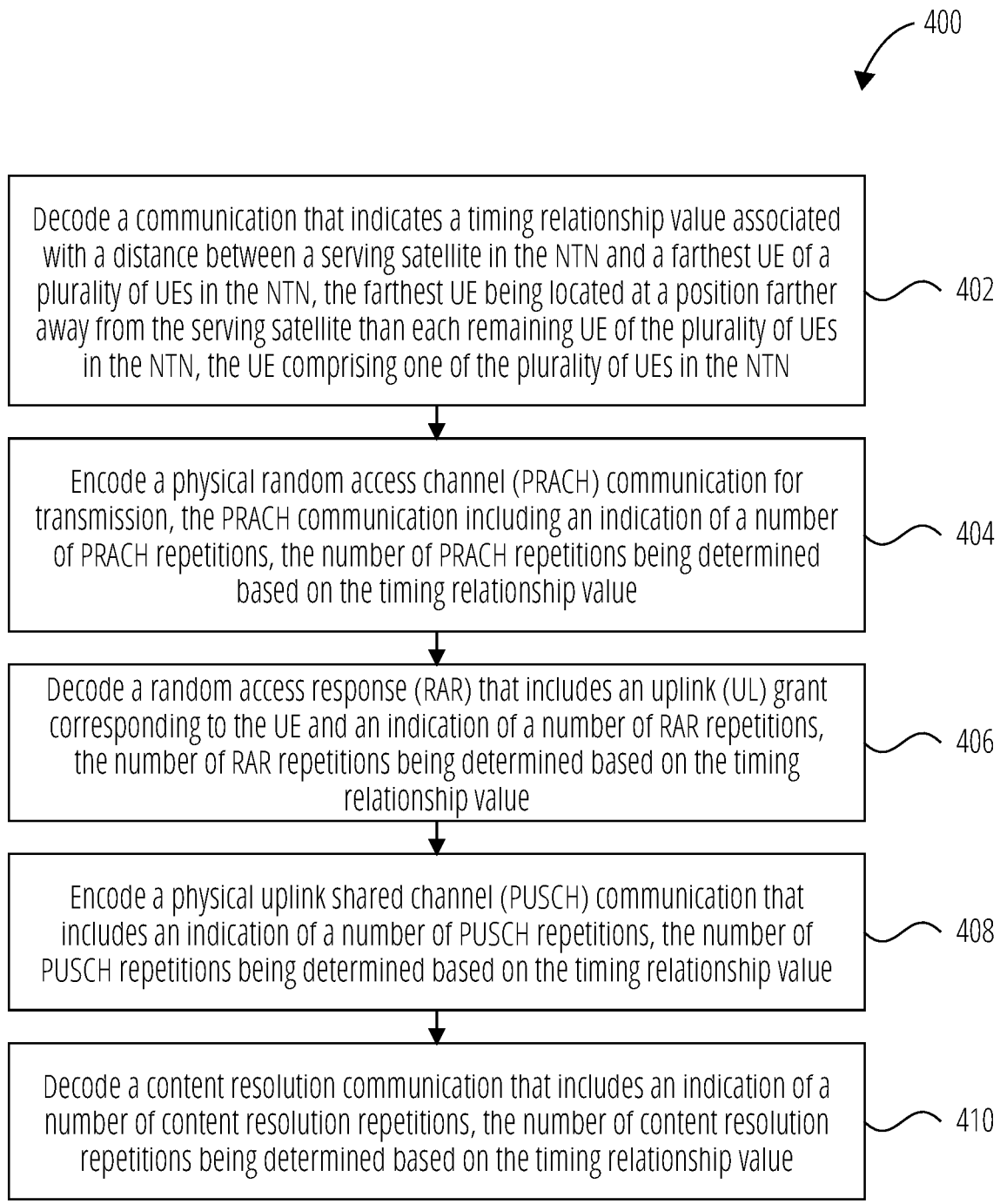
FIG. 4 illustrates a method for indicating repetitions at a user equipment (UE) in a non-terrestrial network (NTN) in accordance with one embodiment.

FIG. 4 illustrates a flowchart of a method 400 for indicating repetitions at a user equipment (UE) in a non-terrestrial network (NTN). In block 402, the method 400 decodes a communication that indicates a timing relationship value associated with a distance between a serving satellite in the NTN and a farthest UE of a plurality of UEs in the NTN. In an example, the timing relationship may comprise a cell-specific k_offset value. Accordingly, the farthest UE may be located at a position farther away from the serving satellite than each remaining UE of the plurality of UEs in the NTN. The UE may comprise one of the plurality of UEs in the NTN.

In block 404, the method 400 encodes a physical random access channel (PRACH) communication for transmission. For instance, the PRACH communication may comprise Msg1 in a 4-step RACH procedure. The PRACH communication may include an indication of a number of PRACH repetitions and the number of PRACH repetitions may be determined based on the timing relationship value.

In block 406, the method 400 decodes a random access response (RAR) that includes an uplink (UL) grant corresponding to the UE and an indication of a number of RAR repetitions. For instance, the RAR may comprise Msg2 in a 4-step RACH procedure. The number of RAR repetitions may be determined based on the timing relationship value.

In block 408, the method 400 encodes a physical uplink shared channel (PUSCH) communication that includes an indication of a number of PUSCH repetitions. For instance, the PUSCH communication may comprise Msg3 of a 4-step RACH procedure. The number of PUSCH repetitions may be determined based on the timing relationship value.

In block 410, the method 400 decodes a content resolution communication that includes an indication of a number of content resolution repetitions. For example, the content resolution communication may comprise Msg4 of a 4-step RACH procedure. The number of content resolution repetitions may be determined based on the timing relationship value.

The method 400 may also include the timing relationship value being broadcast via a system information block (SIB). The method 400 may also include the number of PRACH repetitions being further determined based on a comparison of the timing relationship value and a PRACH timing relationship value threshold. The method 400 may also include the number of RAR repetitions being further determined based on a comparison of the timing relationship value and a RAR timing relationship value threshold.

The method 400 may also include the number of UL scheduling repetitions being further determined based on a comparison of the timing relationship value and a UL scheduling timing relationship value threshold. The method 400 may also include the number of content resolution repetitions being further determined based on a comparison of the timing relationship value and a content resolution timing relationship value threshold.

The method 400 may further include the number of PRACH repetitions, RAR repetitions, UL scheduling repetitions, and content resolution repetitions being further determined based on a comparison of the timing relationship value and a single timing relationship value threshold. The method 400 may further include the single timing relationship value threshold comprises a first value when the NTN is associated with a geosynchronous equatorial orbit (GEO) satellite scenario and a second value when the NTN is associated with a low Earth orbit (LEO) satellite scenario.

The method 400 may further include the single timing relationship value threshold being associated with a number of slots. The method 400 may further include triggering inter-slot frequency hopping based on the timing relationship value. The method 400 may also include inter-slot frequency hopping being applied to at least one of the PRACH communication, the PUSCH communication, the RAR, or the content resolution communication. The method 400 may further include the frequency hopping being defined per slot or per bundling window.

Figure 5:
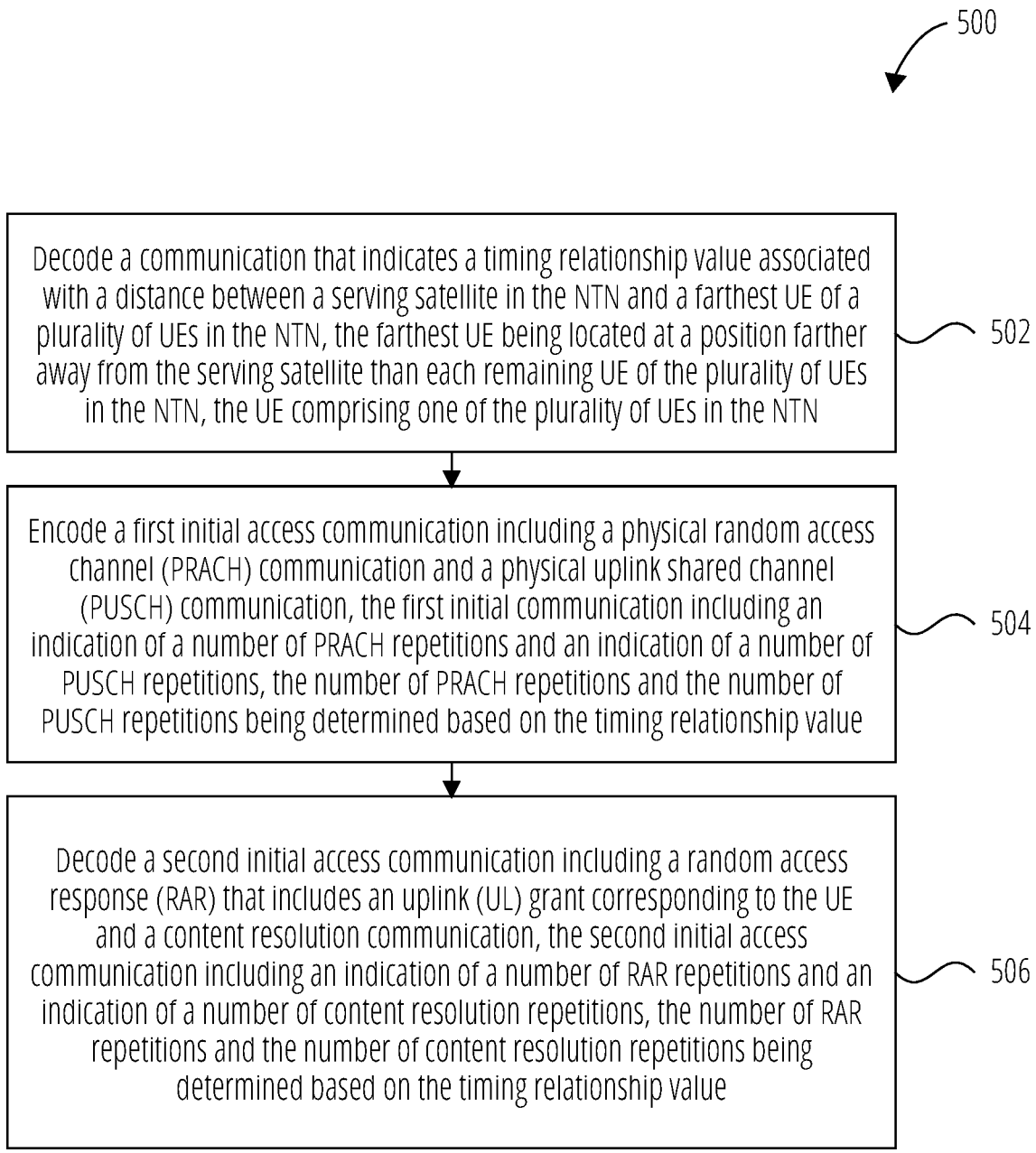
FIG. 5 illustrates a method for indicating repetitions at a user equipment (UE) in a non-terrestrial network (NTN) in accordance with one embodiment.

FIG. 5 illustrates a flowchart of a method 500 for indicating repetitions at a user equipment (UE) in a non-terrestrial network (NTN). In block 502, the method 500 decodes a communication that indicates a timing relationship value associated with a distance between a serving satellite in the NTN and a farthest UE of a plurality of UEs in the NTN. In an example, the timing relationship may comprise a cell-specific k_offset value. Accordingly, the farthest UE may be located at a position farther away from the serving satellite than each remaining UE of the plurality of UEs in the NTN. The UE may comprise one of the plurality of UEs in the NTN.

In block 504, the method 500 encodes a first initial access communication including a physical random access channel (PRACH) communication and a physical uplink shared channel (PUSCH) communication. For instance, the first initial access communication may comprise MsgA of a 2-step RACH procedure. The first initial communication may include an indication of a number of PRACH repetitions and an indication of a number of PUSCH repetitions. The number of PRACH repetitions and the number of PUSCH repetitions may be determined based on the timing relationship value.

In block 506, the method 500 decodes a second initial access communication including a random access response (RAR) that includes an uplink (UL) grant corresponding to the UE and a content resolution communication. For example, the second initial access communication may comprise MsgB in a 2-step RACH procedure. The second initial access communication may include an indication of a number of RAR repetitions and an indication of a number of content resolution repetitions. The number of RAR repetitions and the number of content resolution repetitions may be determined based on the timing relationship value.

The method 500 may further include the number of PRACH repetitions being further determined based on a comparison of the timing relationship and a PRACH timing relationship value threshold and the RAR repetitions being further determined based on a comparison of the timing relationship value and a RAR timing relationship value threshold.

The method 500 may further include the number of PRACH repetitions and RAR repetitions being further determined based on a comparison of the timing relationship value and a single timing relationship value threshold. The method 500 may further include the single timing relationship value threshold comprising a first value when in the NTN is associated with a geosynchronous equatorial orbit (GEO) satellite scenario and a second value when the NTN is associated with a low Earth orbit (LEO) satellite scenario.

The method 500 may further include the timing relationship value threshold being associated with a number of slots. The method 500 may further include triggering inter-slot frequency hopping based on the timing relationship value. The method 500 may further include inter-slot frequency hopping being applied to at least one of the PRACH communication, the PUSCH communication, the RAR, or the content resolution communication. The method 500 may further include the frequency hopping being defined per slot or per bundling window.

Figure 6:
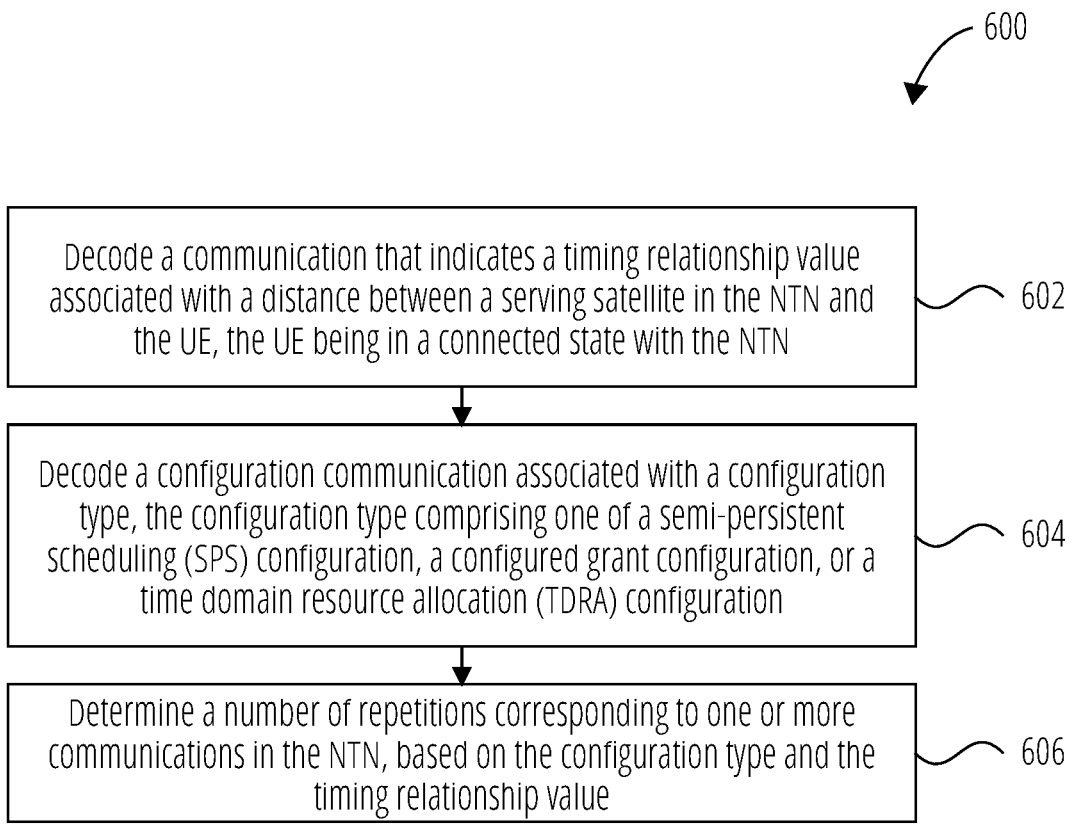
FIG. 6 illustrates a method for indicating repetitions at a user equipment (UE) in a non-terrestrial network (NTN) in accordance with one embodiment.

FIG. 6 illustrates a flowchart of a method 600 for indicating repetitions at a user equipment (UE) in a non-terrestrial network (NTN). In block 602, the method 600 decodes a communication that indicates a timing relationship value associated with a distance between a serving satellite in the NTN and the UE. In an example, the timing relationship value may comprise a UE-specific K_offset value. The UE may be in a connected state with the NTN.

In block 604, the method 600 decodes a configuration communication associated with a configuration type. The configuration type may comprise one of a semi-persistent scheduling (SPS) configuration, a configured grant configuration, or a time domain resource allocation (TDRA) configuration.

In block 606, the method 600 determines a number of repetitions corresponding to one or more communications in the NTN based on the configuration type and the timing relationship value. For instance, the number of repetitions may change based on a UE-specific K_offset value and whether the configuration type comprises an SPS configuration, a configured grant configuration, or a TDRA configuration.

The method 600 may further include configuring more than one physical downlink shared channel (PDSCH) repetition value in the SPS configuration, and determining which of the configured values is used based on the timing relationship value. The method 600 may further include the configuration type comprising the SPS configuration. The method 600 may further include the SPS configuration including multiple (MCS) tables. The method 600 may further include determining which of the multiple MCS tables to use based on the timing relationship value.

The method 600 may further include the configuration type comprising the configured grant configuration. The method 600 may further include the configured grant configuration including multiple configured physical uplink shared channel (PUSCH) repetition values. The method 600 may further include determining which one of the multiple configured repetition values to use based on the timing relationship value.

Embodiments contemplated herein include an apparatus comprising means to perform one or more elements of the method 400, the method 500, and the method 600. This apparatus may be, for example, an apparatus of a UE (such as a wireless device 1002 that is a UE, as described herein).

Embodiments contemplated herein include one or more non-transitory computer-readable media comprising instructions to cause an electronic device, upon execution of the instructions by one or more processors of the electronic device, to perform one or more elements of the method 400, the method 500, and the method 600. This non-transitory computer-readable media may be, for example, a memory of a UE (such as a memory 1006 of a wireless device 1002 that is a UE, as described herein).

Embodiments contemplated herein include an apparatus comprising logic, modules, or circuitry to perform one or more elements of the method 400, the method 500, and the method 600. This apparatus may be, for example, an apparatus of a UE (such as a wireless device 1002 that is a UE, as described herein).

Embodiments contemplated herein include an apparatus comprising: one or more processors and one or more computer-readable media comprising instructions that, when executed by the one or more processors, cause the one or more processors to perform one or more elements of the method 400, the method 500, and the method 600. This apparatus may be, for example, an apparatus of a UE (such as a wireless device 1002 that is a UE, as described herein).

Embodiments contemplated herein include a signal as described in or related to one or more elements of the method 400, the method 500, and the method 600.

Embodiments contemplated herein include a computer program or computer program product comprising instructions, wherein execution of the program by a processor is to cause the processor to carry out one or more elements of the method 400, the method 500, and the method 600. The processor may be a processor of a UE (such as a processor(s) 1004 of a wireless device 1002 that is a UE, as described herein). These instructions may be, for example, located in the processor and/or on a memory of the UE (such as a memory 1006 of a wireless device 1002 that is a UE, as described herein).

Figure 7:
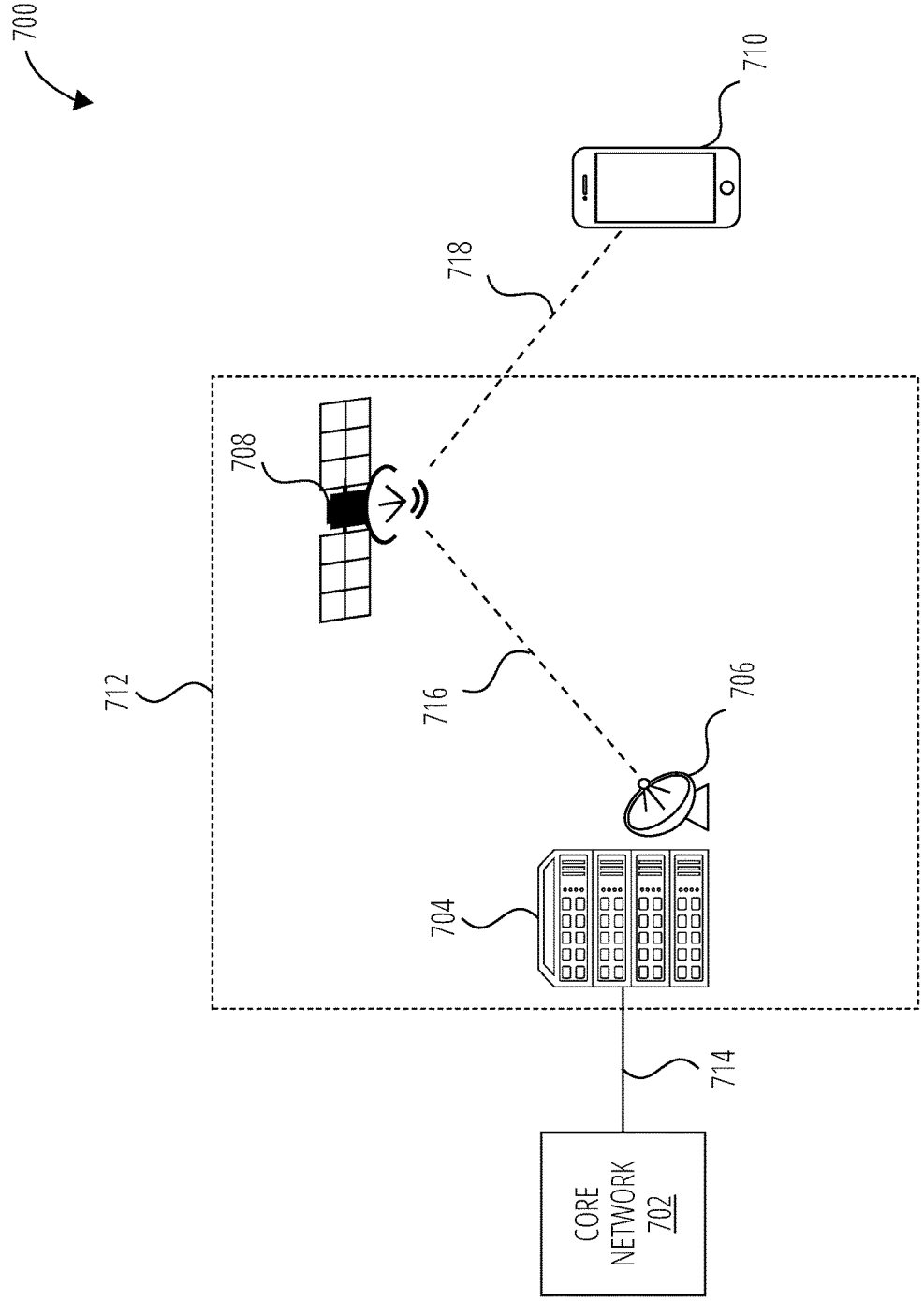
FIG. 7 illustrates a non-terrestrial network (NTN) architecture of a wireless communication system, according to an embodiment.

FIG. 7 illustrates a non-terrestrial network (NTN) architecture 700 of a wireless communication system, according to an embodiment. The NTN architecture 700 includes a core network (CN) 702, a terrestrial base station 704, a satellite gateway 706, a satellite 708, and a UE 710. The terrestrial base station 704, the satellite gateway 706, and the satellite 708 may be included in a RAN 712.

In some embodiments, the RAN 712 includes E-UTRAN, the CN 702 includes an EPC, and the terrestrial base station 704 includes an eNB. In these cases, the CN link 714 connecting the CN 702 and the terrestrial base station 704 may include an S1 interface.

In some embodiments, RAN 712 includes NG-RAN, the CN 702 includes a 5GC, and the terrestrial base station 704 includes a gNB or a next generation eNB (ng-eNB). In such cases, the CN link 714 connecting the CN 702 and the terrestrial base station 704 may include an NG interface.

The NTN architecture 700 illustrates a "bent-pipe" or "transparent" satellite based architecture. In such bent-pipe systems, the terrestrial base station 704 uses the satellite gateway 706 to communicate with the satellite 708 over a feeder link 716. The satellite 708 may be equipped with one or more antennas capable of broadcasting a cell according to the RAN 712, and the UE 710 may be equipped with one or more antennas (e.g., a moving parabolic antenna, an omni-directional phased-array antenna, etc.) capable of communicating with the satellite 708 via a Uu interface on that cell (such communications may be said to use the illustrated service link 718). A payload sited on the satellite 708 then transparently forwards data between the satellite gateway 706 and the UE 710 using the feeder link 716 between the satellite gateway 706 and the satellite 708 and the service link 718 between the satellite 708 and the UE 710. The payload may perform RF conversion and/or amplification in both uplink (UL) and downlink (DL) to enable this communication.

In the embodiment shown in FIG. 7, the terrestrial base station 704 is illustrated without the capability of terrestrial wireless communication directly with a UE. However, it is contemplated that in other embodiments, such a terrestrial base station using the satellite gateway 706 to communicate with the satellite 708 could (also) have this functionality (i.e., as in the terrestrial base station 912 and the terrestrial base station 914 of FIG. 9, to be described below).

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Figure 8:
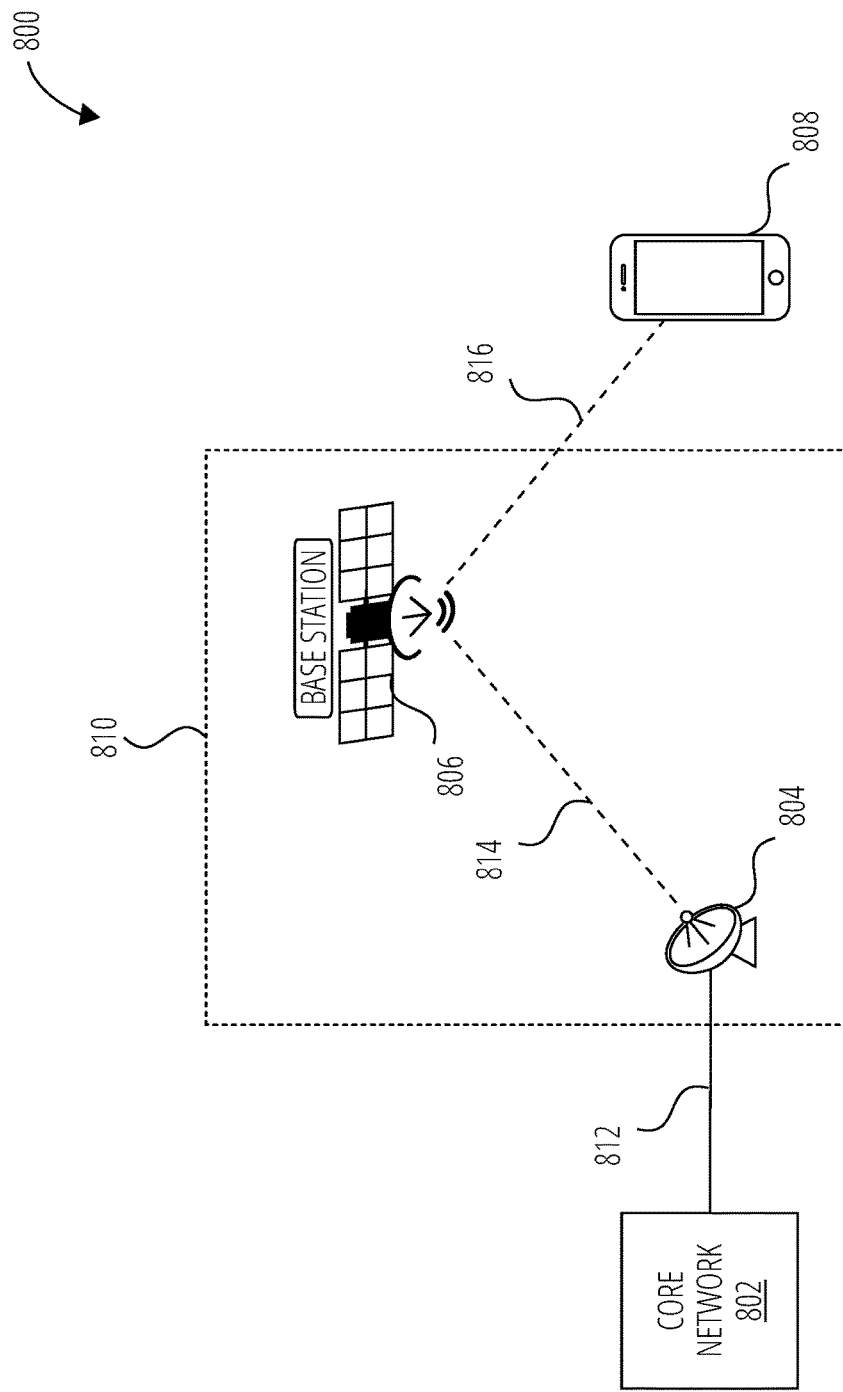
FIG. 8 illustrates an NTN architecture of a wireless communication system, according to an embodiment.

FIG. 8 illustrates an NTN architecture 800 of a wireless communication system, according to an embodiment. The NTN architecture 800 includes a CN 802, a satellite gateway 804, a satellite base station 806, and a UE 808. The satellite gateway 804 and the satellite base station 806 may be included in the RAN 810.

In some embodiments, the RAN 810 includes E-UTRAN and the CN 802 includes an EPC. In these cases, the CN link 812 connecting the CN 802 and the satellite gateway 804 may include an S1 interface.

In some embodiments, RAN 810 includes NG-RAN and the CN 802 includes a 5GC. In such cases, the CN link 812 connecting the CN 802 and the satellite gateway 804 may include an NG interface.

The NTN architecture 700 implements a "regenerative" satellite based architecture. In such regenerative systems, the functionalities of a base station are sited on the satellite base station 806, and the communications between these base station functions and the CN 802 occur through a forwarding of interface(s) (e.g., a S1 interface and/or an NG interface) found on the CN link 812 through the satellite gateway 804 and a feeder link 814 to the satellite base station 806. The satellite base station 806 may be equipped with one or more antennas capable of broadcasting a cell according to the RAN 810, and the UE 808 may be equipped with one or more antennas (e.g., a moving parabolic antenna, an omni-directional phased-array antenna, etc.) capable of communicating with the satellite base station 806 via a Uu interface on that cell (such communications may be said to use the illustrated service link 816). A payload sited on the satellite base station 806 then forwards data between the satellite gateway 804 and the UE 808 using the feeder link 814 between the satellite gateway 804 and the satellite base station 806 and the service link 816 between the satellite base station 806 and the UE 808. The payload may perform RF conversion and/or amplification in both uplink (UL) and downlink (DL) to enable this communication, as well as implement the functionalities of the base station (e.g., as an eNB, ng-eNB or a gNB, as corresponding to the type of the RAN 810) as these have been sited on the satellite base station 806.

In embodiments of NTN architectures comprising NG-RAN that also use integrated access and backhaul (IAB), it is possible that a gNB control unit functionality (CU) could be sited terrestrially and may use a satellite gateway to communicate with a satellite that hosts a corresponding gNB donor unit functionality (DU), with the F1 interface(s) between the CU and the DU underpinned by the feeder link 814. In such cases, the CU and the DU may each be understood to be part of the NG-RAN.

In wireless communications systems using NTN architectures (such as those described in relation to FIG. 7 and FIG. 8 above), it may be that coverage holes may exist when the density of satellites used is insufficient to provide cells covering the entire network operator's deployment area.

Such coverage holes may be spatial and/or temporal in nature. An example of a spatial coverage hole may be that a satellite may provide coverage of a first area, and there may not be a second satellite providing a cell to a second area (meaning that the second area is a coverage hole). As a UE using the satellite to communicate moves, it may leave the first area and enter the second area such that it leaves coverage.

Temporal coverage holes may occur due to satellite movement relative to a fixed position on the planetary surface. While some satellites of some NTNs may be placed in a geostationary earth orbit (GEO), this requires placement at a specific radius relative to the earth. Further, this distance is further out that many feasible distances for low earth orbits (LEOs) or medium earth orbits (MEOs) where a satellite could alternatively be placed. Accordingly, due to cost, orbital capacity, and other factors, it is anticipated that (at least some) satellites of (at least some) NTNs may be placed in, for example, LEOs or MEOs (rather than GEOs).

However, a satellite in LEO or MEO (instead of GEO) travels faster than the rotation speed of the earth in order to maintain its orbit. Accordingly, from the perspective of a fixed position on the earth's surface, such a satellite will move (taking any of its cells along with it). This may occur even in the case of quasi-earth fixed cells (where a satellite changes an antenna beam pattern to illuminate a determined portion of the surface while it is moving), as eventually the satellite (due to movement) will be outright unable to reach that portion of the surface. Thus, a UE at that position on the surface may enjoy coverage provided by the satellite when the satellite is in an appropriate location within its orbit to provide a cell at that position, and may lose coverage (fall into a temporal coverage hole) as the satellite moves further along its orbit.

In networks (or portions of networks) implementing terrestrial transmission reception points (TRPs), when a UE leaves coverage provided by a terrestrial TRP (e.g., due to UE mobility), the UE may be configured to continuously/constantly perform cell search. This behavior may be based on an implicit assumption that the UE is relatively likely to soon enter a coverage state associated with the same or another terrestrial TRP in such networks (e.g., due to an underlying assumption that the UE is likely being operated in locations where terrestrial-based coverage is anticipated by the user of the UE).

However, due to the cost and complexity of provisioning satellites for an NTN (as compared to, e.g., providing terrestrial TRPs), the satellite density of the NTN and thus the density of cells corresponding to the satellites of the NTN may be relatively lower than in the network (or portion of the network) using terrestrial TRPs. Accordingly, it may be expected that UEs operating using cells provided by the satellites of NTNs may encounter more frequent and extended periods of time (relative to a typical terrestrial TRP case) where they are out of coverage (due to their entry into the coverage holes described above). Herein, a UE that is expected to experience these (or other) types of frequent and extended periods out of coverage may be said to be experiencing "discontinuous coverage."

It may be that some UEs use the satellites of the NTN for coverage (and thus may experience discontinuous coverage) because they are located remotely from established infrastructure supporting terrestrial TRPs. This may motivate a use of lower amounts of power at such a UE (e.g., to conserve a battery of the UE and/or to not overtax a relatively limited power source for the UE such as a small solar panel). It may also be that satellites of the NTN can also benefit from power savings, in that these are also usually supplied with power by more limited power sources that can be available while in orbit, such as batteries and/or solar panels.

In these NTN (and other) circumstances, it may be beneficial to configure one or more elements of the wireless communication system to gracefully suspend/interrupt certain procedures (e.g., cell search/connect/camping procedures at the UE, network paging/communication procedures that use the satellite, etc.) in reaction to a loss of coverage at the UE due to a coverage hole, out of a recognition that there is no point in using power to perform these procedures during periods when communications are in any event not possible.

Then, assuming that an ephemeris for the satellites of the NTN is known at the UE (e.g., via pre-configuration and/or by system information provided by one or more satellites themselves), and that the location and/or mobility of the UE is known to the UE (e.g., via pre-configuration (in the case of a stationary UE) and/or global positioning system (GPS)/global navigation satellite system (GNSS) (in the case of a mobile UE)), it may be that the UE can predict when and/or where it is likely to be in or out of coverage. Accordingly, the UE may preemptively (prior to losing coverage) inform the either/both of a CN (e.g., via non-access stratum (NAS) messages) and/or a base station (e.g., via access stratum (AS) messages, such as radio resource control (RRC) messages) that it is going to lose coverage, and/or when and/or where it will regain coverage. The CN/base station may then accordingly be aware of the later time and/or location at which coverage to the UE is expected to be restored. This time and/or location may be used to restart, at the relevant element (UE, CN, base station) any suspended procedures of the wireless communication system relative to these elements.

Figure 9:
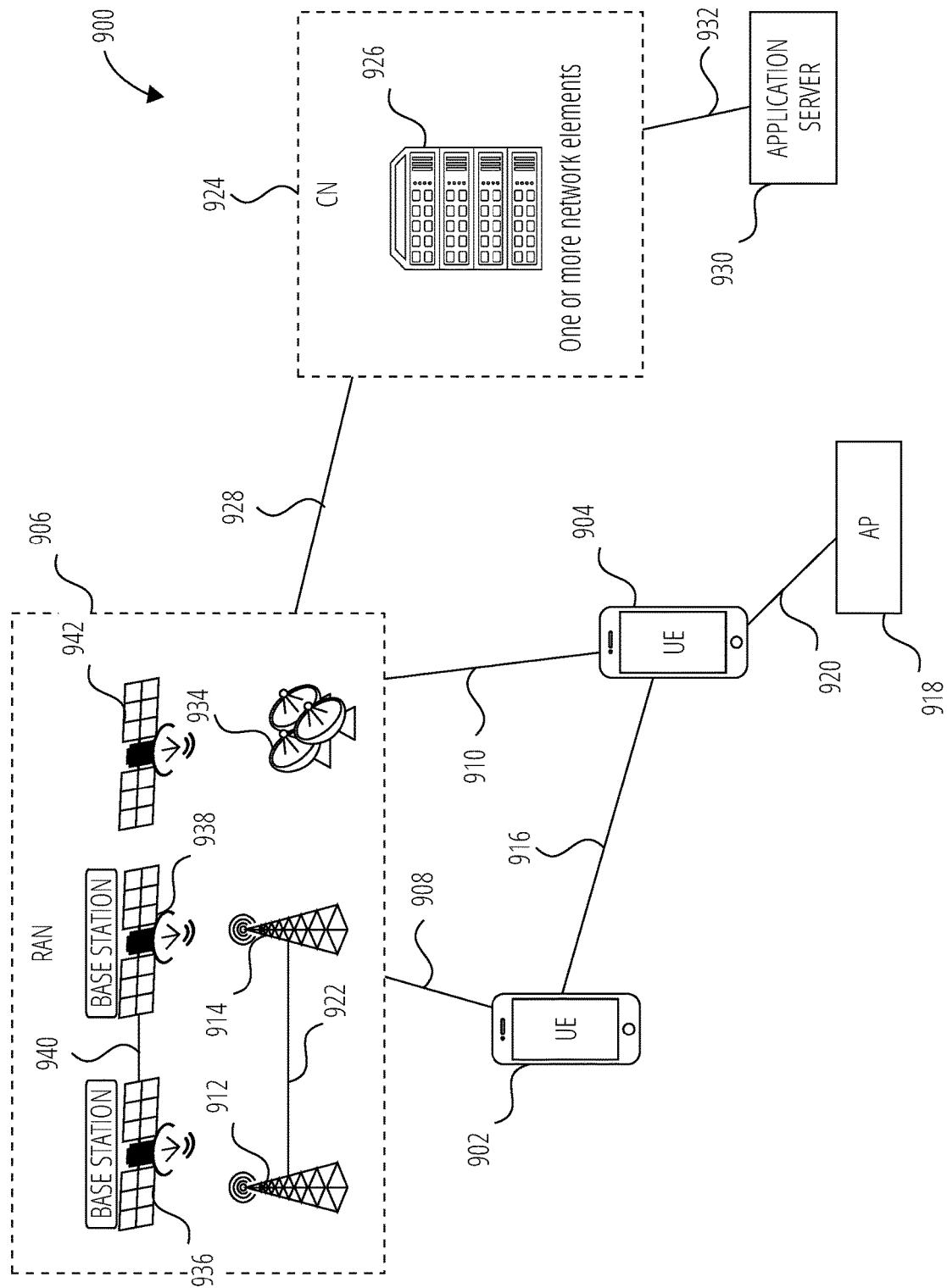
FIG. 9 illustrates an example architecture of a wireless communication system, according to embodiments disclosed herein.

FIG. 9 illustrates an example architecture of a wireless communication system 900, according to embodiments disclosed herein. The following description is provided for an example wireless communication system 900 that operates in conjunction with the LTE system standards and/or 5G or NR system standards as provided by 3GPP technical specifications and other 3GPP documents.

As shown by FIG. 9, the wireless communication system 900 includes UE 902 and UE 904 (although any number of UEs may be used). In this example, the UE 902 and the UE 904 are illustrated as smartphones (e.g., handheld touch-screen mobile computing devices connectable to one or more cellular networks), but may also comprise any mobile or non-mobile computing device configured for wireless communication.

The UE 902 and UE 904 may be configured to communicatively couple with a RAN 906. In embodiments, the RAN 906 may be NG-RAN, E-UTRAN, etc. The UE 902 and UE 904 utilize connections (or channels) (shown as connection 908 and connection 910, respectively) with the RAN 906, each of which comprises a physical communications interface. The RAN 906 can include one or more base stations (such as terrestrial base station 912, the terrestrial base station 914 the satellite base station 936 and the satellite base station 938) and/or other entities (e.g., the satellite 942, which may not have base station functionality) that enable the connection 908 and connection 910. One or more satellite gateways 934 may integrate the satellite base station 936, satellite base station 938, and/or the satellite 942 into the RAN 906, in the manners (and with the appropriate elements) described in relation to the NTN architecture 700 of FIG. 7 and the NTN architecture 800 of FIG. 8.

In this example, the connection 908 and connection 910 are air interfaces to enable such communicative coupling, and may be consistent with RAT(s) used by the RAN 906, such as, for example, an LTE and/or NR. It is contemplated that the connection 908 and connection 910 may include, in some embodiments, service links between their respective UE 902, UE 904 and one or more of the satellite base station 936, the satellite base station 938, and the satellite 942.

In some embodiments, the UE 902 and UE 904 may also directly exchange communication data via a sidelink interface 916.

The UE 904 is shown to be configured to access an access point (shown as AP 918) via connection 920. By way of example, the connection 920 can comprise a local wireless connection, such as a connection consistent with any IEEE 802.11 protocol, wherein the AP 918 may comprise a Wi-Fi® router. In this example, the AP 918 may be connected to another network (for example, the Internet) without going through a CN 924.

In embodiments, the UE 902 and UE 904 can be configured to communicate using orthogonal frequency division multiplexing (OFDM) communication signals with each other, with the terrestrial base station 912, the terrestrial base station 914, the satellite base station 936, the satellite base station 938, and/or the satellite 942 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the terrestrial base station 912, terrestrial base station 914, the satellite base station 936 and/or the satellite base station 938 may be implemented as one or more software entities running on server computers as part of a virtual network.

In addition, or in other embodiments, the terrestrial base station 912 or terrestrial base station 914 may be configured to communicate with one another via interface 922. In embodiments where the wireless communication system 900 is an LTE system (e.g., when the CN 924 is an EPC), the interface 922 may be an X2 interface. The X2 interface may be defined between two or more base stations (e.g., two or more eNBs and the like) that connect to an EPC, and/or between two eNBs connecting to the EPC. It is contemplated than an inter-satellite link (ISL) may carry the X2 interface between in the case of two satellite base stations.

In embodiments where the wireless communication system 900 is an NR system (e.g., when CN 924 is a 5GC), the interface 922 may be an Xn interface. An Xn interface is defined between two or more base stations that connect to 5GC (e.g., CN 924). For example, the Xn interface may be between two or more gNBs that connect to 5GC, a gNB connecting to 5GC and an eNB, between two eNBs connecting to 5GC, and/or two or more satellite base stations via an ISL (as in, e.g., the interface 940 between the satellite base station 936 and the satellite base station 938).

The RAN 906 is shown to be communicatively coupled to the CN 924. The CN 924 may comprise one or more network elements 926, which are configured to offer various data and telecommunications services to customers/subscribers (e.g., users of UE 902 and UE 904) who are connected to the CN 924 via the RAN 906. The components of the CN 924 may be implemented in one physical device or separate physical devices including components to read and execute instructions from a machine-readable or computer-readable medium (e.g., a non-transitory machine-readable storage medium). For example, the components of the CN 924 may be implemented in one or more processors and/or one or more associated memories.

In embodiments, the CN 924 may be an EPC, and the RAN 906 may be connected with the CN 924 via an S1 interface 928. In embodiments, the S1 interface 928 may be split into two parts, an S1 user plane (S1-U) interface, which carries traffic data between the terrestrial base station 912, terrestrial base station 914, the satellite base station 936, or the interface 940 and a serving gateway (S-GW), and the S1-MME interface, which is a signaling interface between the terrestrial base station 912, the terrestrial base station 914 the satellite base station 936, or the interface 940 and mobility management entities (MMEs).

In embodiments, the CN 924 may be a 5GC, and the RAN 906 may be connected with the CN 924 via an NG interface 928. In embodiments, the NG interface 928 may be split into two parts, an NG user plane (NG-U) interface, which carries traffic data between the terrestrial base station 912, terrestrial base station 914, satellite base station 936, or satellite base station 938 and a user plane function (UPF), and the S1 control plane (NG-C) interface, which is a signaling interface between the terrestrial base station 912, terrestrial base station 914 satellite base station 936, or satellite base station 938 and access and mobility management functions (AMFs).

Generally, an application server 930 may be an element offering applications that use internet protocol (IP) bearer resources with the CN 924 (e.g., packet switched data services). The application server 930 can also be configured to support one or more communication services (e.g., VoIP sessions, group communication sessions, etc.) for the UE 902 and UE 904 via the CN 924. The application server 930 may communicate with the CN 924 through an IP communications interface 932.

Figure 10:
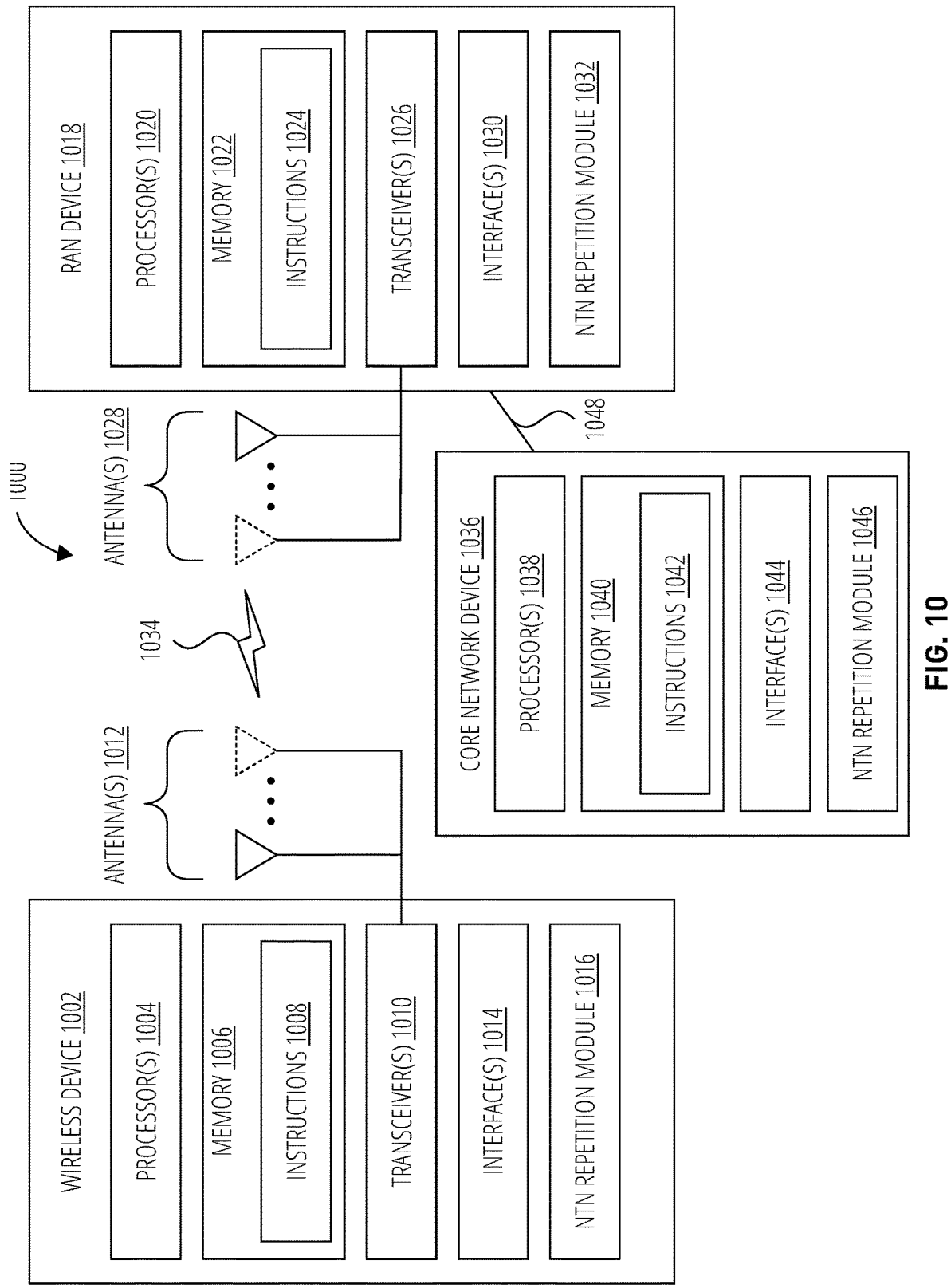
FIG. 10 illustrates a system for performing signaling between a wireless device and a network device, according to embodiments disclosed herein.

FIG. 10 illustrates a system 1000 for performing signaling 1034 between a wireless device 1002 and a RAN device 1018 connected to a core network of a CN device 1036, according to embodiments disclosed herein. The system 1000 may be a portion of a wireless communications system as herein described. The wireless device 1002 may be, for example, a UE of a wireless communication system. The RAN device 1018 may be, for example, a base station (e.g., an eNB or a gNB) of a wireless communication system that is a terrestrial base station or a satellite base station. The CN device 1036 may be one or more devices making up a CN, as described herein.

The wireless device 1002 may include one or more processor(s) 1004. The processor(s) 1004 may execute instructions such that various operations of the wireless device 1002 are performed, as described herein. The processor(s) 1004 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 1002 may include a memory 1006. The memory 1006 may be a non-transitory computer-readable storage medium that stores instructions 1008 (which may include, for example, the instructions being executed by the processor(s) 1004). The instructions 1008 may also be referred to as program code or a computer program. The memory 1006 may also store data used by, and results computed by, the processor(s) 1004.

The wireless device 1002 may include one or more transceiver(s) 1010 that may include radio frequency (RF) transmitter and/or receiver circuitry that use the antenna(s) 1012 of the wireless device 1002 to facilitate signaling (e.g., the signaling 1034) to and/or from the wireless device 1002 with other devices (e.g., the RAN device 1018) according to corresponding RATs. In some embodiments, the antenna(s) 1012 may include a moving parabolic antenna, an omni-directional phased-array antenna, or some other antenna suitable for communication with a satellite, (e.g., as described above in relation to the UE 710 of FIG. 7 and the UE 808 of FIG. 8).

For a RAN device 1018 that is a terrestrial base station, the network device signaling 1034 may occur on a feeder link between the wireless device 1002 and a satellite and a service link between the satellite and the RAN device 1018 (e.g., as described in relation to FIG. 7). For a RAN device 1018 that is a satellite base station, the signaling 1034 may occur on a feeder link between the wireless device 1002 and the RAN device 1018 (e.g., as described in relation to FIG. 8).

The wireless device 1002 may include one or more antenna(s) 1012 (e.g., one, two, four, or more). For embodiments with multiple antenna(s) 1012, the wireless device 1002 may leverage the spatial diversity of such multiple antenna(s) 1012 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 1002 may be accomplished according to precoding (or digital beamforming) that is applied at the wireless device 1002 that multiplexes the data streams across the antenna(s) 1012 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 1002 may implement analog beamforming techniques, whereby phases of the signals sent by the antenna(s) 1012 are relatively adjusted such that the (joint) transmission of the antenna(s) 1012 can be directed (this is sometimes referred to as beam steering).

The wireless device 1002 may include one or more interface(s) 1014. The interface(s) 1014 may be used to provide input to or output from the wireless device 1002. For example, a wireless device 1002 that is a UE may include interface(s) 1014 such as microphones, speakers, a touchscreen, buttons, and the like in order to allow for input and/or output to the UE by a user of the UE. Other interfaces of such a UE may be made up of made up of transmitters, receivers, and other circuitry (e.g., other than the transceiver(s) 1010/antenna(s) 1012 already described) that allow for communication between the UE and other devices and may operate according to known protocols (e.g., Wi-Fi®, Bluetooth®, and the like).

The wireless device 1002 may include NTN repetition module 1016. The NTN repetition module 1016 may be implemented via hardware, software, or combinations thereof. For example, the NTN repetition module 1016 may be implemented as a processor, circuit, and/or instructions 1008 stored in the memory 1006 and executed by the processor(s) 1004. In some examples, the NTN repetition module 1016 may be integrated within the processor(s) 1004 and/or the transceiver(s) 1010. For example, the NTN repetition module 1016 may be implemented by a combination of software components (e.g., executed by a DSP or a general processor) and hardware components (e.g., logic gates and circuitry) within the processor(s) 1004 or the transceiver(s) 1010.

The NTN repetition module 1016 may be used for various aspects of the present disclosure, for example, aspects of FIG. 1 through FIG. 6. The NTN repetition module 1016 is configured to, for example, assist in determining a number of repetitions associated with any given transmission of a UE based at least partially on a K_offset value in an NTN.

The RAN device 1018 may include one or more processor(s) 1020. The processor(s) 1020 may execute instructions such that various operations of the RAN device 1018 are performed, as described herein. The processor(s) 1004 may include one or more baseband processors implemented using, for example, a CPU, a DSP, an ASIC, a controller, an FPGA device, another hardware device, a firmware device, or any combination thereof configured to perform the operations described herein.

The RAN device 1018 may include a memory 1022. The memory 1022 may be a non-transitory computer-readable storage medium that stores instructions 1024 (which may include, for example, the instructions being executed by the processor(s) 1020). The instructions 1024 may also be referred to as program code or a computer program. The memory 1022 may also store data used by, and results computed by, the processor(s) 1020.

The RAN device 1018 may include one or more transceiver(s) 1026 that may include RF transmitter and/or receiver circuitry that use the antenna(s) 1028 of the RAN device 1018 to facilitate signaling (e.g., the signaling 1034)

to and/or from the RAN device 1018 with other devices (e.g., the wireless device 1002) according to corresponding RATs.

The RAN device 1018 may include one or more antenna(s) 1028 (e.g., one, two, four, or more). In embodiments having multiple antenna(s) 1028, the RAN device 1018 may perform MIMO, digital beamforming, analog beamforming, beam steering, etc., as has been described.

For a RAN device 1018 that is a terrestrial base station, one or more of the transceiver(s) 1026 and/or the antenna(s) 1028 may instead be present on a satellite gateway associated with the base station (e.g., as shown in reference to the terrestrial base station 704 and the satellite gateway 706 of FIG. 7). For a RAN device 1018 that is a satellite base station, the transceiver(s) 1026 and/or the antenna(s) 1028 may be present on the satellite, and one or more of those antenna(s) 1028 may be antenna(s) appropriate for satellite communication (such as a moving parabolic antenna, an omni-directional phased-array antenna, etc.)

The RAN device 1018 may include one or more interface(s) 1030. The interface(s) 1030 may be used to provide input to or output from the RAN device 1018. For example, a RAN device 1018 that is a base station may include interface(s) 1030 made up of transmitters, receivers, and other circuitry (e.g., other than the transceiver(s) 1026/antenna(s) 1028 already described) that enables the base station to communicate with other equipment in a CN, and/or that enables the base station to communicate with external networks, computers, databases, and the like for purposes of operations, administration, and maintenance of the base station or other equipment operably connected thereto.

The RAN device 1018 may include a NTN repetition module 1032. The NTN repetition module 1032 may be implemented via hardware, software, or combinations thereof. For example, the NTN repetition module 1032 may be implemented as a processor, circuit, and/or instructions 1024 stored in the memory 1022 and executed by the processor(s) 1020. In some examples, the NTN repetition module 1032 may be integrated within the processor(s) 1020 and/or the transceiver(s) 1026. For example, the NTN repetition module 1032 may be implemented by a combination of software components (e.g., executed by a DSP or a general processor) and hardware components (e.g., logic gates and circuitry) within the processor(s) 1020 or the transceiver(s) 1026.

The NTN repetition module 1032 may be used for various aspects of the present disclosure, for example, aspects of FIG. 1 through FIG. 6. The NTN repetition module 1032 is configured to, for example, assist in determining a number of repetitions associated with transmissions from the network based on a K_offset value in an NTN.

The RAN device 1018 may communicate with the CN device 1036 via the interface 1048, which may be analogous to the interface 928 of FIG. 9 (e.g., may be an S1 and/or NG interface, either of which may be split into user plane and control plane parts).

The CN device 1036 may include one or more processor(s) 1038. The processor(s) 1038 may execute instructions such that various operations of the CN device 1036 are performed, as described herein. The processor(s) 1038 may include one or more baseband processors implemented using, for example, a CPU, a DSP, an ASIC, a controller, an FPGA device, another hardware device, a firmware device, or any combination thereof configured to perform the operations described herein.

The CN device 1036 may include a memory 1040. The memory 1040 may be a non-transitory computer-readable storage medium that stores instructions 1042 (which may include, for example, the instructions being executed by the processor(s) 1038). The instructions 1042 may also be referred to as program code or a computer program. The memory 1040 may also store data used by, and results computed by, the processor(s) 1038.

The CN device 1036 may include one or more interface(s) 1044. The interface(s) 1044 may be used to provide input to or output from the CN device 1036. For example, a CN device 1036 may include interface(s) 1030 made up of transmitters, receivers, and other circuitry that enables the CN device 1036 to communicate with other equipment in the CN, and/or that enables the CN device 1036 to communicate with external networks, computers, databases, and the like for purposes of operations, administration, and maintenance of the CN device 1036 or other equipment operably connected thereto.

The CN device 1036 may include a NTN repetition module 1046. The NTN repetition module 1046 may be implemented via hardware, software, or combinations thereof. For example, the NTN repetition module 1046 may be implemented as a processor, circuit, and/or instructions 1042 stored in the memory 1040 and executed by the processor(s) 1038. In some examples, the NTN repetition module 1046 may be integrated within the processor(s) 1038. For example, the NTN repetition module 1046 may be implemented by a combination of software components (e.g., executed by a DSP or a general processor) and hardware components (e.g., logic gates and circuitry) within the processor(s) 1038.

The NTN repetition module 1046 may be used for various aspects of the present disclosure, for example, aspects of FIG. 1 through FIG. 6. The NTN repetition module 1046 is configured to, for example, assist in determining a number of repetitions associated with transmissions from the network based on a K_offset value in an NTN.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for indicating repetitions at a user equipment (UE) in a non-terrestrial network (NTN), the method comprising:
    decoding a communication that indicates a timing relationship value associated with a distance between a serving satellite in the NTN and a farthest UE of a plurality of UEs in the NTN, the farthest UE being located at a position farther away from the serving satellite than each remaining UE of the plurality of UEs in the NTN, the UE comprising one of the plurality of UEs in the NTN;
    encoding a physical random access channel (PRACH) communication for transmission, the PRACH communication including an indication of a number of PRACH repetitions, the number of PRACH repetitions being determined based on the timing relationship value;
    decoding a random access response (RAR) that includes an uplink (UL) grant corresponding to the UE and an indication of a number of RAR repetitions, the number of RAR repetitions being determined based on the timing relationship value;
    encoding a physical uplink shared channel (PUSCH) communication that includes an indication of a number of PUSCH repetitions, the number of PUSCH repetitions being determined based on the timing relationship value; and
    decoding a content resolution communication that includes an indication of a number of content resolution repetitions, the number of content resolution repetitions being determined based on the timing relationship value.

2. The method of claim 1, wherein the timing relationship value is broadcast via a system information block (SIB).

3. The method of claim 1, wherein the number of PRACH repetitions is further determined based on a comparison of the timing relationship value and a PRACH timing relationship value threshold.

4. The method of claim 1, wherein the number of RAR repetitions is further determined based on a comparison of the timing relationship value and a RAR timing relationship value threshold.

5. The method of claim 1, wherein a number of UL scheduling repetitions is determined based on a comparison of the timing relationship value and a UL scheduling timing relationship value threshold.

6. The method of claim 1, wherein the number of content resolution repetitions is further determined based on a comparison of the timing relationship value and a content resolution timing relationship value threshold.

7. The method of claim 1, wherein the number of PRACH repetitions, the number of RAR repetitions, a number of UL scheduling repetitions, and the number of content resolution repetitions are further determined based on a comparison of the timing relationship value and a single timing relationship value threshold.

8. The method of claim 7, wherein the single timing relationship value threshold comprises a first value when the NTN is associated with a geosynchronous equatorial orbit (GEO) satellite scenario and a second value when the NTN is associated with a low Earth orbit (LEO) satellite scenario.

9. The method of claim 7, wherein the single timing relationship value threshold is associated with a number of slots.

10. The method of claim 1, further comprising triggering inter-slot frequency hopping based on the timing relationship value, inter-slot frequency hopping being applied to at least one of the PRACH communication, the PUSCH communication, the RAR, or the content resolution communication.

11. The method of claim 10, wherein the frequency hopping is defined per slot or per bundling window.

12. A method for indicating repetitions at a user equipment (UE) in a non-terrestrial network (NTN), the method comprising:
    decoding a communication that indicates a timing relationship value associated with a distance between a serving satellite in the NTN and a farthest UE of a plurality of UEs in the NTN, the farthest UE being located at a position farther away from the serving satellite than each remaining UE of the plurality of UEs in the NTN, the UE comprising one of the plurality of UEs in the NTN;
    encoding a first initial access communication including a physical random access channel (PRACH) communication and a physical uplink shared channel (PUSCH) communication, the first initial communication including an indication of a number of PRACH repetitions and an indication of a number of PUSCH repetitions, the number of PRACH repetitions and the number of PUSCH repetitions being determined based on the timing relationship value; and
    decoding a second initial access communication including a random access response (RAR) that includes an uplink (UL) grant corresponding to the UE and a content resolution communication, the second initial access communication including an indication of a number of RAR repetitions and an indication of a number of content resolution repetitions, the number of RAR repetitions and the number of content resolution repetitions being determined based on the timing relationship value.

13. The method of claim 12, wherein the number of PRACH repetitions are further determined based on a comparison of the timing relationship and a PRACH timing relationship value threshold and the RAR repetitions are further determined based on a comparison of the timing relationship value and a RAR timing relationship value threshold.

14. The method of claim 12, wherein the number of PRACH repetitions and the number of RAR repetitions are further determined based on a comparison of the timing relationship value and a single timing relationship value threshold.

15. The method of claim 14, wherein the single timing relationship value threshold comprises a first value when in the NTN is associated with a geosynchronous equatorial orbit (GEO) satellite scenario and a second value when the NTN is associated with a low Earth orbit (LEO) satellite scenario.

16. The method of claim 12, further comprising triggering inter-slot frequency hopping based on the timing relationship value, inter-slot frequency hopping being applied to at least one of the PRACH communication, the PUSCH communication, the RAR, or the content resolution communication.

17. A method for indicating repetitions at a user equipment (UE) in a non-terrestrial network (NTN), the method comprising:
 decoding a communication that indicates a timing relationship value associated with a distance between a serving satellite in the NTN and the UE, the UE being in a connected state with the NTN;
 decoding a configuration communication associated with a configuration type, the configuration type comprising one of a semi-persistent scheduling (SPS) configuration, a configured grant configuration, or a time domain resource allocation (TDRA) configuration; and
 determining a number of physical downlink shared channel (PDSCH) repetitions or a number of physical uplink shared channel (PUSCH) repetitions corresponding to one or more communications in the NTN, based on the configuration type and the timing relationship value.

18. The method of claim 17, further comprising configuring more than one PDSCH repetition value in the SPS configuration, and determining which of the more than one PDSCH repetition value is used based on the timing relationship value.

19. The method of claim 17, wherein the configuration type comprises the SPS configuration, the SPS configuration including multiple (MCS) tables, wherein determining which of the multiple MCS tables to use is based on the timing relationship value.

20. The method of claim 17, wherein the configuration type comprises the configured grant configuration, the configured grant configuration including multiple configured PUSCH repetition values, wherein determining which one of the multiple configured PUSCH repetition values to use is based on the timing relationship value.

* * * * *